F. P. SCHMIDT.
AUTOMOBILE PUMP.
APPLICATION FILED DEC. 30, 1916.

1,235,062.

Patented July 31, 1917.

Inventor
F. P. SCHMIDT
By H. S. Hier
Attorney

UNITED STATES PATENT OFFICE.

FREDRICK P. SCHMIDT, OF COOK, NEBRASKA.

AUTOMOBILE-PUMP.

1,235,062.  Specification of Letters Patent.  Patented July 31, 1917.

Application filed December 30, 1916. Serial No. 139,329.

*To all whom it may concern:*

Be it known that I, FREDRICK P. SCHMIDT, a citizen of the United States, residing at Cook, in the county of Johnson, State of Nebraska, have invented a new and useful Automobile-Pump; and I do hereby declare the following to be a full, clear, and exact description of the invention, such as will enable others skilled in the art to which it appertains to make and use the same.

The present invention relates to a tire pump attachment for automobiles, and has for its object to provide a device of this character which embodies novel features of construction whereby the rotation of one of the drive wheels can be utilized to actuate the pump when the wheel is jacked up above the ground.

Further objects of the invention are to provide a device of this character which is comparatively simple and inexpensive in its construction, which can be readily applied to any automobile, which can be quickly thrown into operative position, and which will enable the power of the engine to be utilized for driving the pump, thereby avoiding the tedious and back breaking operation of pumping tires by hand.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
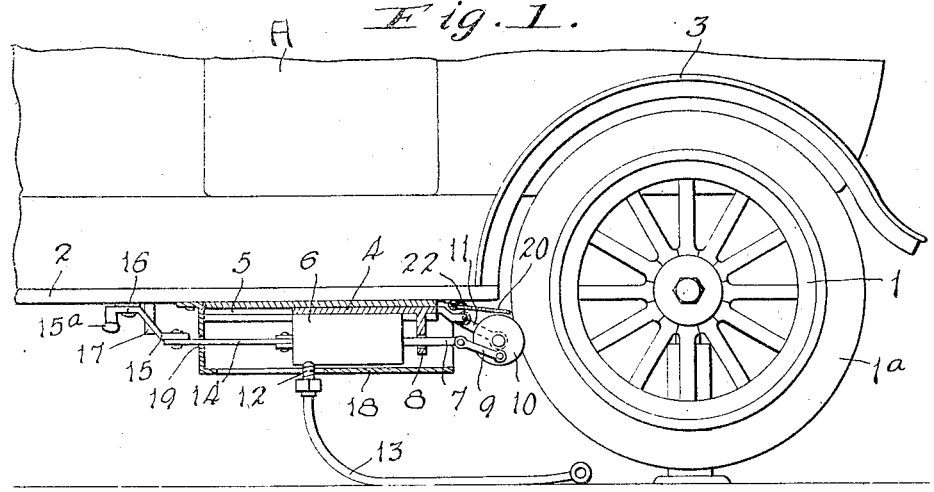
Figure 1 is a fragmentary side elevation of an automobile showing a pump attachment constructed in accordance with the invention applied thereto, portions being broken away and shown in section.
Figure 2:
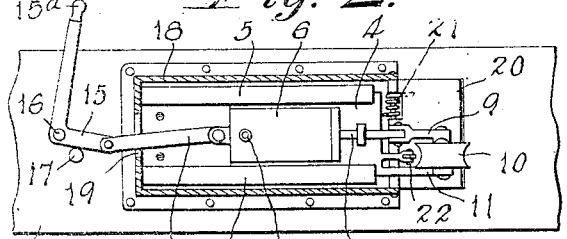
Fig. 2 is a bottom plan view of the pump attachment.
Figure 3:
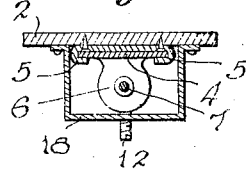
Fig. 3 is a transverse vertical sectional view through the pump casing and guide.

Referring to the drawings, the reference character A designates a fragmentary portion of an automobile which may be of any conventional construction, including a drive wheel 1, running board 2, and mud guard 3. Mounted in a convenient position upon the vehicle frame and adjacent to the drive wheel 1 is a slide 4, said slide being arranged to be moved toward and away from the tire 1ª of the wheel 1. Suitable guide strips 5 are shown as engaging the edges of the slide 4 to direct it in its backward and forward movements, and the slide carries the cylinder 6 of an air pump. The piston rod 7 of the air pump is engaged by a suitable guide 8 and arranged to reciprocate back and forth, the forward end of the piston rod being pivotally connected by a pitman 9 to a wheel 10 which is journaled upon a bracket 11 projecting from the slide 4. The periphery of the wheel 10 is grooved for engagement with the tire 1ª of the wheel 1, so that when the slide is moved to bring the wheel into a firm engagement with the tire, the pump will be actuated by the rotation of the drive wheel 1 of the automobile, the latter being jacked up above the ground so that it can be driven by the engine without moving the vehicle itself. A nipple 12 upon the pump cylinder 6 is designed to engage one end of a flexible air-pipe 13, the latter terminating in the usual nipple for attachment to the air valve casing of an automobile tire.

The rear end of the slide 4 is pivotally connected by a link 14 to one arm of a bell crank lever 15 which is pivotally mounted upon the running board 2 at 16. When the handle end 15ª of the bell crank lever 15 is swung forwardly under the running board 2, the slide 4 is retracted and the wheel 10 moved out of engagement with the tire 1ª. When it is desired to move the pump into operative position, the handle 15ª is swung outwardly and rearwardly until the short arm of the bell crank lever engages a stop 17, whereupon the wheel 10 will be moved into a forcible engagement with the tire 1ª of the drive wheel 1. It will also be observed that the link 14 and short arm of the bell crank lever 15 are then swung inwardly slightly beyond a dead center position, so that the pressure of the wheel 10 upon the tire 1ª serves to lock the pump in operative position. With the vehicle jacked up above the ground, and the engine operated with the transmission gear in low speed, the wheel 1 can be driven slowly and the pump 7 operated for the purpose of pumping up a tire.

It may be found desirable to arrange the pump mechanism within a casing 18 which will protect it from injury and prevent mud and dirt from accumulating thereon. The rear end of the casing 18 is shown as slotted at 19 to provide a clearance opening for the link 14, while the forward end of the casing may be normally closed by a swinging door 20. This door is shown as hinged at the upper edge thereof and as normally held in a closed position by a spring 21. A small wheel 22 may be provided upon the slide 4 for engaging the door 20 to swing it automatically upwardly into an open position when the slide 4 is moved rearwardly to bring the wheel 10 into engagement with the tire 1ª. The use of this casing will prevent mud from accumulating upon the pump in such a manner as to interfere with the satisfactory operation thereof.

Figure 4:
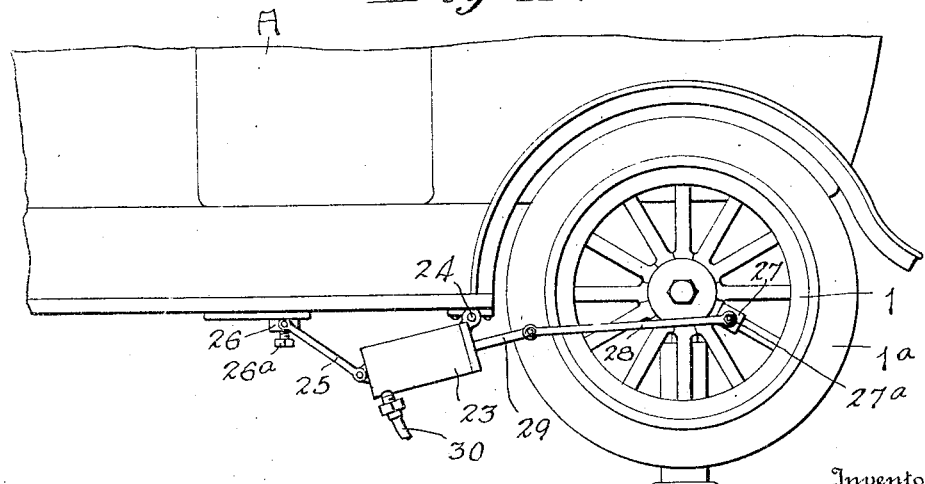
Fig. 4 is a view similar to Fig. 1 showing a modification.

A slight modification is shown by Fig. 4, in which a pump cylinder 23 is shown as hingedly connected at 24 to the rear end of the running board 2, so that it can either be folded upwardly against the bottom of the running board or swung downwardly into an angular position to bring the axis thereof in alinement with the axis of the automobile drive wheel 1. A link 25 loosely connects the swinging end of the pump cylinder 23 to a slide 26 on the running board, said slide being adapted to be locked in any adjusted position by a set screw 26ª. This construction enables the pump cylinder 23 to be rigidly held in operative position, with the axis thereof in alinement with the axis of the drive wheel 1. A clip 27 is detachably applied to one of the spokes of the wheel 1, said clip carrying a spindle 27ª which is connected by a pitman 28 to the end of the piston rod 29 of the pump. This pitman is detachable, although when the parts are assembled, as indicated above, it will be obvious that the pump will be actuated when the drive wheel 1 of the vehicle is rotated. The usual flexible tube 30 is provided for conveying air pressure from the pump to any one of the tires.

Having thus described the invention, what I claim as new and desire to secure by Letters Patent, is:—

1. A tire pump attachment for automobiles, including in combination a slide mounted upon the running board, a pump carried by the slide, a wheel carried by the slide and operatively connected to the pump, an operating lever mounted upon the running board, a link connection between the operating lever and the slide for moving the slide to bring the wheel thereof into engagement with the tire of one of the automobile drive wheels, and stop means for limiting the movements of the operating lever when the lever and link have been swung slightly beyond a dead center and the slide is in operative position.

2. A tire pump attachment for automobiles, including in combination a slide mounted on the running board, a pump carried by the slide, a wheel carried by the slide and operatively connected to the pump, means for moving the slide to bring the wheel thereof into engagement with the tire of one of the automobile drive wheels, and a housing inclosing the slide and formed with a door constructed to be automatically opened when the slide is moved into operative position.

3. A tire pump attachment for automobiles, including in combination a slide mounted upon the running board, a pump carried by the slide, a bracket arm projecting from the slide, a grooved wheel journaled upon the bracket arm and operatively connected to the pump, a lever operatively connected to the slide for moving the same to bring the grooved wheel into engagement with the tire of one of the automobile drive wheels, a casing inclosing the slide and formed with a hinged door, a spring normally holding the hinged door in a closed position, and a roller on the slide for engaging the hinged door to automatically open the same when the slide is moved into operative position.

In testimony whereof I have signed my name to this specification in the presence of two subscribing witnesses.

FREDRICK P. SCHMIDT.

Witnesses:
JOHN SCHOWALTER,
C. H. BICKEL.